US006932135B2

(12) United States Patent
Tabuchi

(10) Patent No.: US 6,932,135 B2
(45) Date of Patent: Aug. 23, 2005

(54) LABEL-PASTING METHOD, LABEL-PASTING DEVICE, MATERIAL SHEET OF LABELS, AND LABEL

(75) Inventor: Kunihiro Tabuchi, Kagawa Prefecture (JP)

(73) Assignee: Toa Machine Industry, Inc., Kagawa Prefecture (JP)

( * ) Notice: Subject to any disclaimer, the term of this patent is extended or adjusted under 35 U.S.C. 154(b) by 383 days.

(21) Appl. No.: 09/866,478

(22) Filed: May 29, 2001

(65) Prior Publication Data

US 2002/0056513 A1 May 16, 2002

(30) Foreign Application Priority Data

Nov. 10, 2000 (JP) ....................................... 2000-344115

(51) Int. Cl.[7] ................................................ B32B 31/00

(52) U.S. Cl. ....................... 156/518; 156/519; 156/520; 156/552

(58) Field of Search ................................ 156/256, 264, 156/265, 518, 519, 520, 269, 270, 299, 302; 427/286, 288, 197, 208.4, 208.6, 208.2; 118/211, 301, 406

(56) References Cited

U.S. PATENT DOCUMENTS

| | | | | | |
|---|---|---|---|---|---|
| 2,524,945 | A | * 10/1950 | Von Hofe | 156/320 |
| 4,992,125 | A | * 2/1991 | Suzuki et al. | 156/164 |
| 5,351,426 | A | * 10/1994 | Voy et al. | 40/638 |
| 5,674,345 | A | * 10/1997 | Nash | 156/264 |
| 5,837,087 | A | * 11/1998 | Ahr | 156/250 |
| 6,494,244 | B2 | * 12/2002 | Parrish et al. | 156/519 |

* cited by examiner

*Primary Examiner*—Chris Fiorilla
*Assistant Examiner*—Cheryl N. Hawkins
(74) *Attorney, Agent, or Firm*—Arent Fox, PLLC

(57) ABSTRACT

The present invention relates to a label-pasting method and a label-pasting device which do not require peeling-off paper and hence enable low-cost label pasting. A label-pasting device comprising (i) an adhesive applier for applying pressure-sensitive adhesive to a label-material sheet composed of only label material and fed from its roll, (ii) a die cutter for cutting out labels from the label-material sheet with pressure-sensitive adhesive, and (iii) a label paster for pasting the cut-out labels on a packing sheet. Because the label-material sheet is composed of only label material and no peeling-off paper is used, the label-pasting cost is low.

2 Claims, 10 Drawing Sheets

LABEL-PASTING METHOD, LABEL-PASTING DEVICE, MATERIAL SHEET OF LABELS, AND LABEL

BACKGROUND OF THE INVENTION

The present invention relates to a label-pasting method and a label-pasting device. The "label" used in this specification means not only lid labels to open and close packages of wet tissue paper, etc. repeatedly but also indicatory labels for such packages.

The lid label means a label pasted on an opening of a package to take out the contents of the package through it, regardless of its location. FIGS. 8 and 9 show examples of lid labels. Lid label 101 of the first example of FIG. 8 is pasted on an opening 102*a* made in the top of a package 102. Lid label 201 of the second example of FIG. 9 is pasted on an opening 202*a* extending from the top to a side of a package 202.

The indicatory label (not shown in any figures) means labels other than the lid label.

The present invention relates to a label-pasting method and a label-pasting device applicable to both the lid and the indicatory label.

Referring to FIG. 10, reference sign SS is a peeling-off sheet; reference numeral 101, a label. The top surface of the peeling-off sheet SS is coated with silicone, and pressure-sensitive adhesive is applied to the back of each label 101. Accordingly labels 101 can be peeled off the peeling-off sheet SS. A large number of labels 101 are arranged on the peeling-off sheet SS, in its longitudinal direction, which is rolled up.

To paste labels on packages 102, a peeling-off sheet SS carrying labels 101 is fed from its roll and each label is peeled off the sheet SS and pasted on a package 102.

The peeling-off sheet SS is expensive because its surface is coated with silicone. Besides, it cannot be recycled and has to be disposed of after it is used once. On the other hand, it is necessary to use peeling-off paper to paste labels on packages in accordance with the prior art. Accordingly such a label-pasting method is costly.

In accordance with the above, the object of the present invention is to provide a label-pasting method and a label-pasting device which do not require peeling-off paper and hence enable low-cost label pasting.

SUMMARY OF THE INVENTION

According to the first aspect of this invention, there is provided a label-pasting method comprising the steps of (i) feeding a label-material sheet, which is composed of only label material, from its roll and applying pressure-sensitive adhesive to the label-material sheet, (ii) cutting out labels from the label-material sheet with pressure-sensitive adhesive, and (iii) pasting the cut-out labels on a packing sheet.

According to the second aspect of this invention, there is provided a label-pasting method characterized by the pressure-sensitive adhesive which is hot melt adhesive and applied to an area within the outline of, and smaller than, each label portion of the label-material sheet to be cut out in the next step.

According to the third aspect of this invention, there is provided a label-pasting device comprising (i) an adhesive applier for applying pressure-sensitive adhesive to a label material sheet composed of only label material, (ii) a die cutter for cutting out labels from the label-material sheet with pressure-sensitive adhesive, and (iii) a label paster for pasting the cut-out labels on a packing sheet.

According to the fourth aspect of this invention, there is provided a label-pasting device wherein (i) the adhesive applier and the die cutter are synchronized, (ii) the adhesive applier applies pressure-sensitive sensitive adhesive to an area within the outline of, and smaller than, each label portion of the label-material sheet to be cut out by the die cutter, and (iii) the pressure-sensitive adhesive is hot melt adhesive.

According to the fifth aspect of this invention, there is provided a label-pasting device wherein (i) an anvil roller constituting the die cutter serves as the label paster too and (ii) the anvil roller is disposed so as to be rotatable in contact with a running surface of the packing sheet and provided with a vacuum mechanism which sucks each cut-out label onto the periphery of the anvil roller until said label is pasted on the packing sheet.

According to the sixth aspect of this invention, there is provided a label-pasting device of which the label paster comprises (i) said anvil roller which is separated from the said running surface of the packing sheet, (ii) a conveying belt which is disposed between the anvil roller and the top surface of the packing sheet and carries each label received from the anvil roller in the running direction of the packing sheet, and (iii) a pressing belt which is disposed on the downstream side of the conveying belt and presses each label onto the packing sheet.

According to the seventh aspect of this invention, there is provided a label-pasting device of which the label paster is a vacuum-belt unit disposed on the exit side of the die cutter. The vacuum-belt unit comprises (i) a small-diameter roller disposed close to the exit of the die cutter, (ii) a large-diameter roller which is disposed so as to be in contact with the packing sheet and provided with a vacuum mechanism, and (iii) a vacuum belt which is laid around the small-diameter roller and the large-diameter roller and has many ventholes.

According to the eighth aspect of this invention, there is provided a label-pasting device wherein a pair of pressure rollers is disposed on the downstream side of the large-diameter roller to press each label onto the packing sheet.

According to the ninth aspect of this invention, there is provided a label-material sheet composed of only label material and having label portions arranged successively in its longitudinal direction.

According to the tenth aspect of this invention, there is provided a label with hot melt adhesive applied to its back, the adhesive-applied area being within the outline of, and smaller than, the label.

According to the eleventh aspect of this invention, there is provided labels which are cut out from a label-material sheet composed of only label material while the label-material sheet is fed from its roll and hot melt adhesive is applied to an area of the back of each label portion of the label-material sheet, the area being within the outline of, and smaller than, said label portion.

The advantage offered by the first aspect of the invention is as follows. Pressure-sensitive adhesive is applied to a label-material sheet composed of only label material, and labels cut out from the label-material sheet are pasted on a packing sheet, without using peeling-off paper. Thus the label-pasting cost is low.

The advantage offered by the second aspect of the invention is as follows. Because hot melt adhesive is applied to an area within the outline of, and smaller than, each label, the hot melt adhesive is prevented from overflowing the edge of said label even when temperature rises.

The advantage offered by the third aspect of the invention is as follows. The adhesive applier applies pressure-sensitive adhesive to a label-material sheet, the die cutter cuts out labels from the label-material sheet, and the label paster pastes the labels on a packing sheet. The label-material sheet is composed of only label material, comprising no peeling-off paper. The labels cut out from the label-material sheet are pasted on the packing sheet successively. Thus the label-pasting cost is low.

The advantage offered by the fourth aspect of the invention is as follows. The adhesive applier and the die cutter are synchronized, and the adhesive applier applies hot melt adhesive to an area within the outline of, and smaller than, each label portion to be cut out by the die cutter; accordingly the hot melt adhesive is prevented from overflowing the edge of said label even when temperature rises.

The advantage offered by the fifth aspect of the invention is as follows. Because the vacuum mechanism sucks each label onto the periphery of the anvil roller until said label is pasted on a packing sheet, each label is accurately pasted on the packing sheet.

The advantage offered by the sixth aspect of the invention is as follows. The conveying belt carries each label received from the anvil roller in the running direction of a packing sheet, and the pressing belt presses each label onto the packing sheet. Accordingly labels are pasted on the packing sheet firmly.

The advantage offered by the seventh aspect of the invention is as follows. Each label is pasted on a packing sheet by the large-diameter roller while said label is sucked onto the ventholes of the vacuum belt by the vacuum mechanism of the roller; therefore positional slippage of labels is prevented and labels are accurately pasted on the packing sheet.

The advantage offered by the eighth aspect of the invention is as follows. Because the pressure roller presses each label onto a packing sheet, each label is pasted firmly on the packing sheet.

The advantage offered by the ninth aspect of the invention is as follows. Because the label-material sheet is composed of only label material, comprising no peeling-off sheet, the label-pasting cost is low.

The advantage offered by the tenth aspect of the invention is as follows. Because hot melt adhesive is applied to an area within the outline of, and smaller than, each label, the hot melt adhesive is prevented from overflowing the edge of said label even when temperature rises.

The advantage offered by the eleventh aspect of the invention is as follows. Because labels are produced without using peeling-off paper, they are produced at low cost. In addition, because hot melt adhesive is applied to an area within the outline of, and smaller than, each label, the hot melt adhesive is prevented from overflowing the edge of said label even when temperature rises.

BRIEF DESCRIPTION OF THE DRAWINGS

The features and advantages of the present invention will become more clearly appreciated from the following description in conjunction with the accompanying drawings, in which.

DETAILED DESCRIPTION OF THE PREFERRED EMBODIMENT

Figure 1:
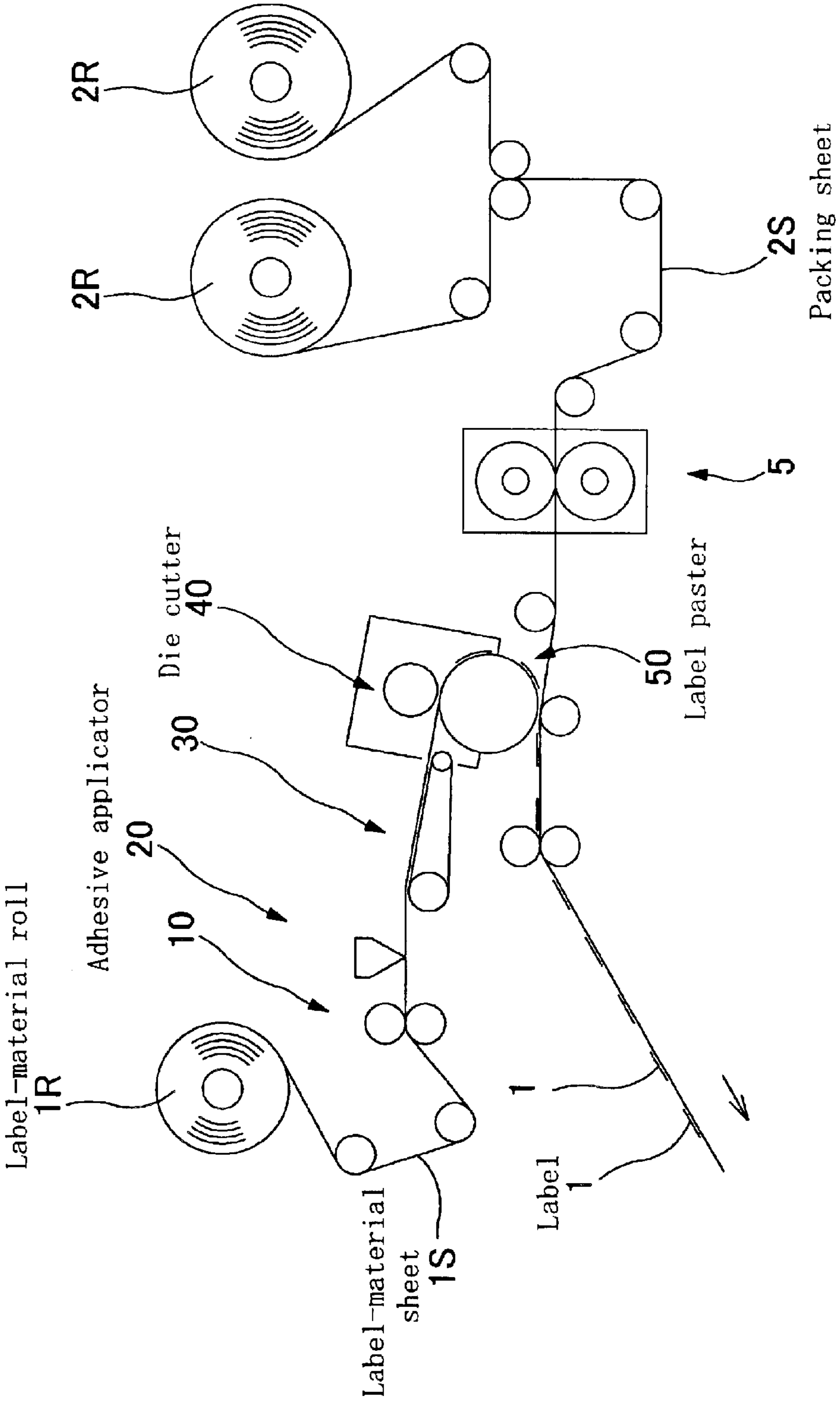
FIG. 1 is a schematic side view of the an embodiment of label-pasting device of the present invention.

Referring to the drawings, a preferred embodiment of label-pasting device of the present invention will now be described.

Figure 2:
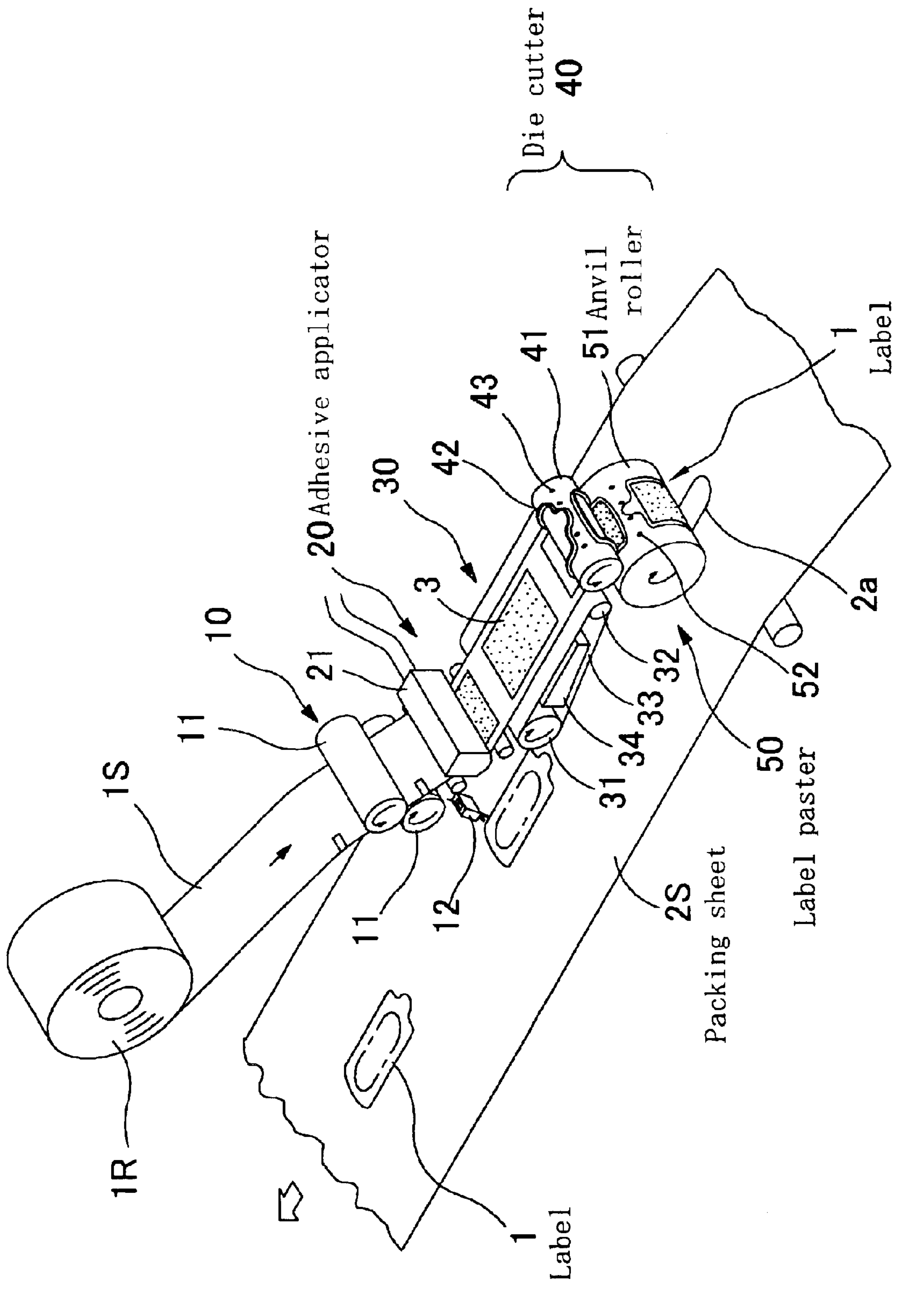
FIG. 2 is a perspective view of the main part of the label-pasting device of FIG. 1.

As shown in FIGS. 1 and 2, the label-pasting device comprises a sheet-feeding unit 10, an adhesive applier 20, a conveying unit 30, and a die cutter 40.

An anvil roller 51 constituting the die cutter 40 serves as a label paster 50 too. The anvil roller 51, alias label paster 50, will be described in detail later.

Reference sign 2R is a packing-sheet roll. The packing-sheet roll 2R is the roll of a packing sheet 2S of a synthetic resin. The packing sheet 2S is fed to the next step (not shown) to constitute packages.

Two packing-sheet rolls 2R are provided so that packing sheets 2S can be fed continuously without a break. When the packing sheet 2S of a packing-sheet roll 2R runs out, a joining device joins the top end of the packing sheet 2S of another packing-sheet roll 2R to the tail end of the preceding packing sheet 2S so that packing sheets 2S can be fed continuously. Only one of two packing-sheet rolls 2R is feeding its packing sheet 2S at any time.

A die cutter 5 disposed above, or upstream of, the label paster 50 processes the packing sheet 2S fed from a packing-sheet roll 2R to make processed annular lid portions **2*a* in the sheet at regular intervals in its running direction. When a package is used, the portion of the packing film surrounded by the annular lid portion 2*a*** is removed to leave an opening behind, through which the contents of the package are taken out.

Figure 3:
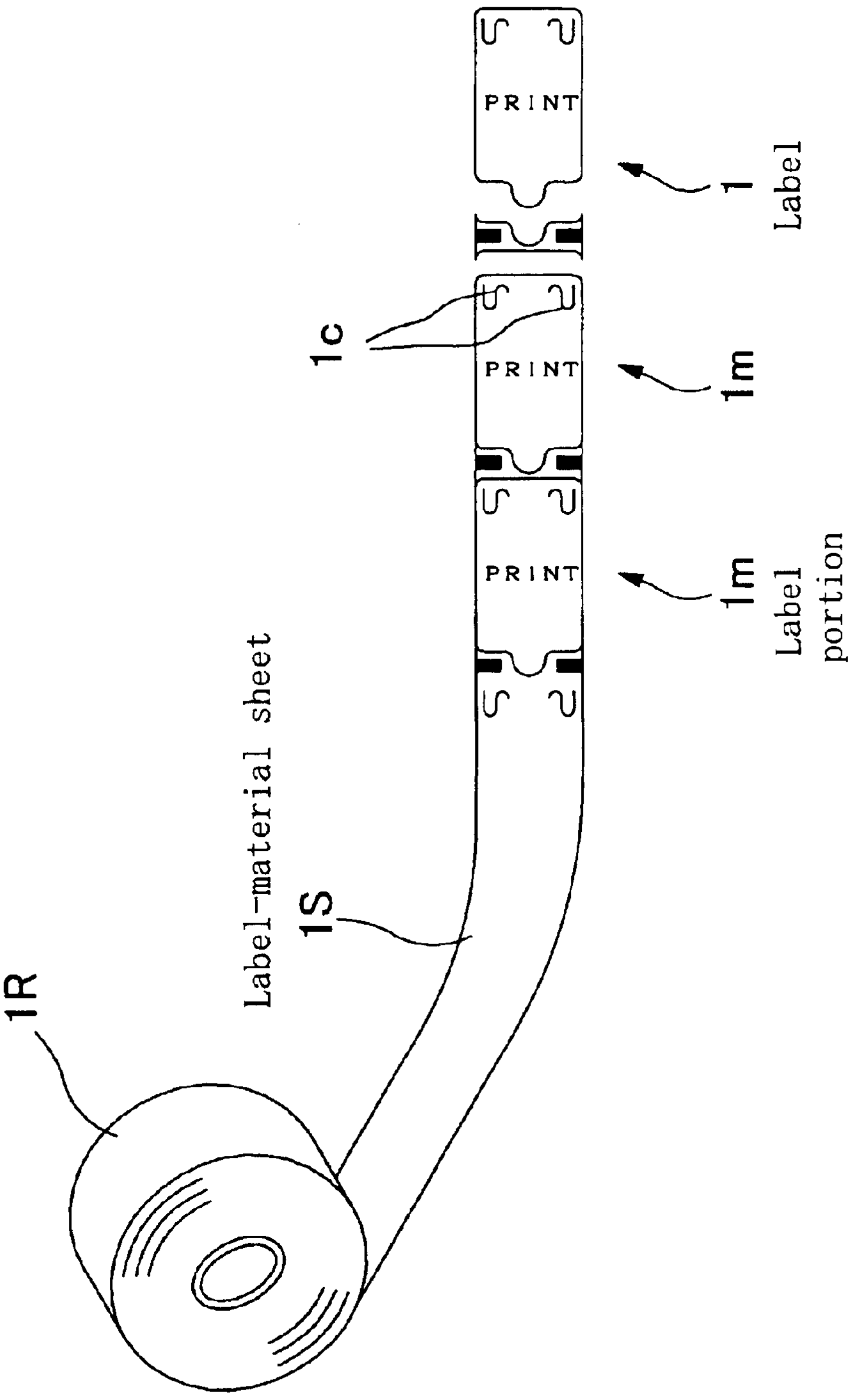
FIG. 3 shows the label-material sheet of FIG. 2.

In FIG. 3, reference sign 1R is the roll of a label-material sheet 1S. The label-material sheet 1S is composed of only label material of synthetic resin or paper, comprising no peeling-off paper. The label-material sheet 1S has label portions **1*m* formed repeated in its running direction. The label portions 1*m* are cut off the label-material sheet 1S by the die cutter 40 to become labels 1. Each label portion 1*m* is printed with a design and has cuts 1*c***.

The design and the cuts **1*c* are dispensable. Any designs may be adopted. The cuts 1*c* may be in any shape. Besides, the label portion 1*m*** can be meant to become either of a lid label and an indication label.

Although cutting lines are drawn on the label-material sheet 1S to cut off the label portions **1*m* in FIG. 3**, these cutting lines do not mean perforations. In fact, no perforations are made on the lines.

It is preferable that the label-material sheet 1S and the packing sheet 2S are made of a certain kind of synthetic resin or synthetic paper because it is resistant to chemicals, does not allow water and gas to permeate through itself, and is durable. The label-material sheet 1S and the packing sheet 2S may be a single-layer film or a multi-layer sheet of polyethylene, polypropylene, polyester, polyamide, polyvinyl chloride, etc. Such a single-layer synthetic-resin film or such a multi-layer synthetic-resin sheet may be combined with a sheet of aluminum foil, paper, etc. to form a composite sheet to be used as the label-material sheet 1S and the packing sheet 2S. A synthetic paper is made by adding an inorganic filler and small amounts of additives to a thermoplastic resin such as polypropylene, agitating and melting the mixture, form the compound into a sheet with an extruder, and orienting it biaxially. Because the synthetic paper is oriented in both longitudinal and lateral directions, it has excellent mechanical characteristics including high strength and rigidity. While the synthetic paper is being oriented, microvoids are formed in it. The microvoids reflect light diffusely, making the paper look opaque and white. Thus, the synthetic paper is given paper-like characteristics. It can be printed and written on. Therefore, the synthetic paper is suitable for use as the label-material sheet 1S and the packing sheet 2S.

The surface of such a synthetic film or sheet or a synthetic-paper sheet on which an adhesive layer is to be formed may be treated by corona discharge or an anchoring agent may be applied to the surface in order to allow the adhesive layer to adhere to the surface securely and prevent any part of the adhesive from remaining on the surface of a sheet when the former film or sheet is pressed onto and peeled off the latter sheet.

As shown in FIG. 2, the label-material sheet 1S fed from a material-sheet roll 1R runs through the sheet-feeding unit 10, the adhesive applier 20, the conveying unit 30, the die cutter 40, and the label paster 50 in the order of their description here.

The sheet-feeding unit 10 will first be described below.

Paired feeding rollers 11 and 11 are disposed horizontally so as to be freely rotatable around their axes of rotation. The label-material sheet 1S runs through between the paired feeding rollers 11 and 11. Accordingly, by rotating the paired feeding rollers 11 and 11, the label-material sheet 1S can be fed.

A sensor 12 is disposed above the packing sheet 2S to detect its running speed. The rotational speed of the feeding rollers 11 is controlled in accordance with the signals of the sensor 12. Thus, the label-material sheet 1S can be synchronized with the packing sheet 2S.

Next, the adhesive applier 20 will be described below.

The adhesive applier 20 is disposed below, or downstream of, the sheet-feeding unit 10. Hot melt adhesive fed through a tube is applied from a tip of a head 21 of the adhesive applier 20 to the backs of the label portions 1*m* of the label-material sheet 1S. By regulating the application time of pressure-sensitive adhesive 3, it can be applied to the back of the label-material sheet 1S at regular intervals in its running direction. Although hot melt adhesive is cited above as pressure-sensitive adhesive 3, other known pressure-sensitive adhesives made of polyester, acrylate, rubber, etc. may be used.

Pressure-sensitive adhesive 3 is so applied to the back of each label portion 1*m* that a margin is left between the outline of said label portion 1*m* and the outline of the adhesive-applied portion. The relation between the label 1 produced by cutting off each label portion 1*m* with a cutter blade 42 and the width and the length of the adhesive-applied portion on the back of the label 1 will be described later.

Next the conveying unit 30 will be described below.

Paired conveying rollers 31 and 32 are disposed horizontally, below or downstream of the head 21, so as to be freely rotatable around their axes of rotation. A belt 33 is laid around the conveying rollers 31 and 32. Many ventholes (not shown) are made in the belt 33. A vacuum box 34 is disposed between the conveying rollers 31 and 32, between the upper and lower sides of the belt 33. The vacuum box 34 sucks air through its top to generate negative pressure. The belt 33 carries the label-material sheet 1S. Because while the belt 33 is running to carry the label-material sheet 1S, the vacuum box 34 sucks the sheet 1S, the sheet 1S can be carried securely.

Next the die cutter 40 will be described below.

The die cutter 40 is disposed on the downstream side of the conveying unit 30. The die cutter 40 comprises a pair of a cutter roller 41 and an anvil roller 51, each roller being disposed horizontally so as to be freely rotatable around its axis of rotation. The rotational speeds of the cutter roller 41 and the anvil roller 51 are controlled so as to synchronize with the working of the adhesive applier 20. The label-material sheet 1S is fed into between the cutter roller 41 and the anvil roller 51.

A cutter blade 42 is formed on the periphery of the cutter roller 41. The cutter blade 42 may be in any shape so long as it is in the shape of labels 1 to be cut off the label-material sheet 1S. Labels 1 in the shape of the cutter blade 42 are cut off the label-material sheet 1S by the cutter blade 42.

Ventholes 43 are made in the periphery of the cutter roller 41. Air is blown out and sucked in through the ventholes 43 by means of a blower (not shown) and a vacuum pump (not shown). Air is sucked in through the ventholes 43 in the lower half of the periphery of the cutter roller 41 and blown out through the ventholes 43 in the upper half of the periphery. Thus the trim (not shown) of each label 1 is sucked onto the lower half of the periphery by the ventholes 43 and blown off the upper half of the periphery by the ventholes 43.

Next the anvil roller 51 will be described below.

The anvil roller 51 is disposed horizontally under the cutter roller 41 so as to be freely rotatable and in contact with the cutter blade 42. Every time the label-material sheet 1S is caught between the periphery of the anvil roller 51 and the cutter blade 42 of the cutter roller 41, a label 1 is cut off the sheet 1S.

Although not shown, the trims of cut-off labels 1 are collected and disposed of.

Figure 4:
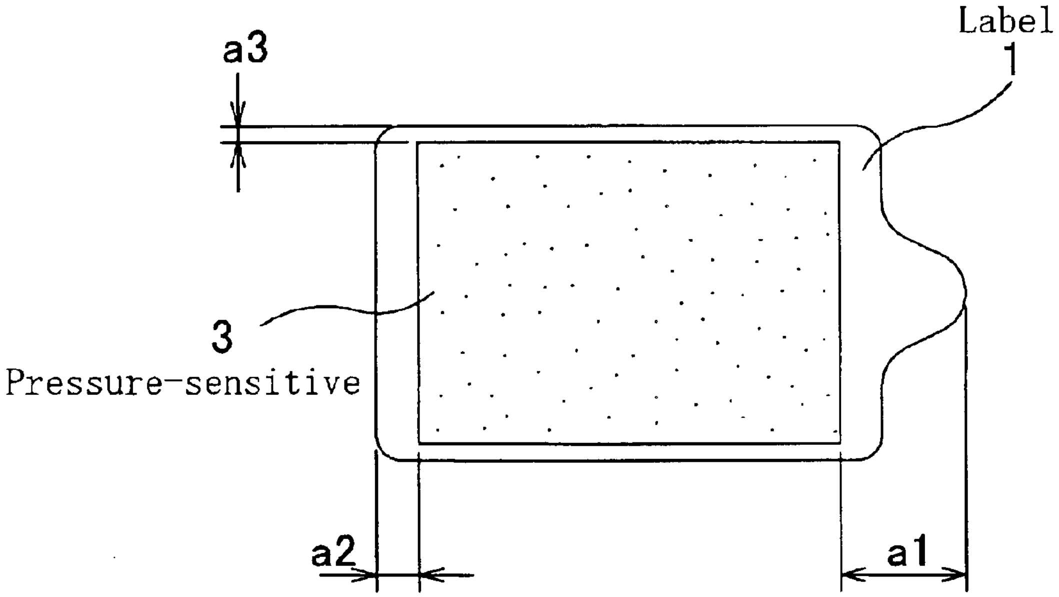
FIG. 4 is a plan view of a label with pressure-sensitive adhesive of FIG. 3.

As shown in the FIG. 4, pressure-sensitive adhesive 3 is applied to the label 1. The width of the adhesive-applied area is smaller than that of the label 1, leaving a margin of "a3" on each side. The length of the adhesive-applied area is smaller than that of the label 1, leaving a margin of "a1" on one end and a margin of "a2" on the other end.

Namely, the area, to which pressure-sensitive adhesive 3 is applied by the adhesive applier 20, of each label portion of the label-material sheet 1S is within the outline of, and smaller than, said label portion. Therefore, even it temperature rises, the pressure-sensitive adhesive 3 is prevented from overflowing the edge of the label 1.

In the label-pasting device of the first embodiment, the anvil roller 51 constituting the die cutter 40 serves as the label paster 50 too. Now the configuration of the anvil roller 51, alias label paster 50, will be described.

The anvil roller 51 is so disposed that its periphery is in contact with a running surface of the packing sheet 2S while it is rotating. Accordingly labels 1 are sent one after another to the packing sheet 2S by the rotation of the anvil roller 51 and each label 1 is pasted on an annular lid portion 2*a* of the packing sheet 2S.

Blowing holes 52 and sucking holes (hidden under labels 1) are made in the periphery of the anvil roller 51. Air is blown out of the blowing holes 52 by means of a blower (not shown) to remove the trim immediately after each label 1 is cut off.

The sucking holes generate negative pressure by means of a blower or a vacuum pump, constituting a vacuum mechanism. This vacuum mechanism sucks each cut-off label 1 onto the periphery of the anvil roller 51 until it is pasted on the packing sheet 2S. Thus labels 1 are prevented from slipping on the periphery of the anvil roller 51 and, therefore, their positional slippage is prevented.

The blowing holes 52 are dispensable depending on the kinds of label-material sheets 1S.

The workings and the effect of the label-pasting device in accordance with the first embodiment will now be described.

The label-material sheet 1S fed from a material-sheet roll 1R is caught between the paired feeding rollers 11 and 11 to be fed to the adhesive applier 20. Because the rotational speed of the feeding rollers 11 is synchronized with the running speed of a packing sheet 2S, the run of the label-material sheet 1S is synchronized with the run of the packing sheet 2S.

Next the adhesive applier 20 applies pressure-sensitive adhesive 3 to the label portions 1*m* of the label-material sheet 1S one after another. The area of each label portion 1*m* to which pressure-sensitive adhesive 3 is applied is within the outline of, and smaller than, said label portion 1*m*.

Then the conveying unit 30 feeds the label-material sheet 1S into between the cutter roller 41 and the anvil roller 51 of the die cutter 40.

While the label-material sheet 1S is caught and running through between the cutter blade 42 of the cutter roller 41 and the periphery of the anvil roller 51, the label portions 1*m* are cut off to become labels 1 one after another. Each label 1 is sucked onto the periphery of the anvil roller 51 by the sucking holes (not shown) of the roller 51. Accordingly as the anvil roller 51 rotates, each label 1 is sent to and pasted on the packing sheet 2S. Because the label-material sheet 1S is synchronized with the packing sheet 2S, each label 1 is pasted exactly on an annular lid portion 2*a* of the packing sheet 2S.

Then the packing sheet 2S is fed to the next step (not shown) to be cut along certain lines and constitute packages.

As described above, with the label-pasting device of the first embodiment, labels 1 cut off a label-material sheet 1S composed of only label material are mechanically successively pasted on fixed parts of a packing sheet 2S without using peeling-off paper. Therefore the label-pasting cost is kept low.

Now another embodiment of label-pasting device will be described.

Figure 5:
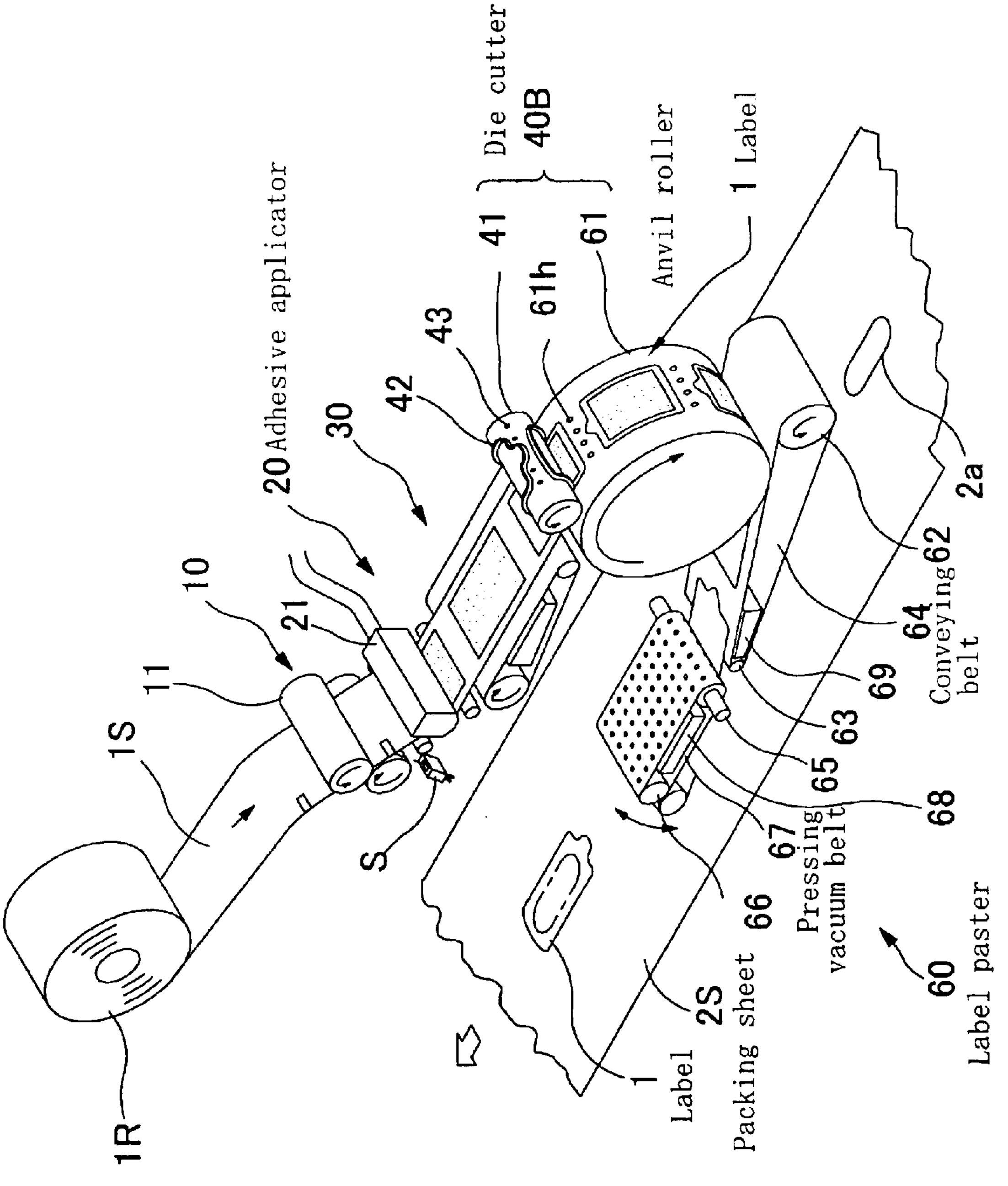
FIG. 5 is a perspective view of the main part of another embodiment of label-pasting device of the present invention.

As shown in FIG. 5, the label-pasting device comprises a sheet-feeding unit 10, an adhesive applier 20, a conveying unit 30, a die cutter 40B, and a label paster 60. The sheet-feeding unit 10, the adhesive applier 20, and the conveying unit 30 are substantially the same as those of the label-pasting device of the first embodiment.

Accordingly the die cutter 40B and the label paster 60 will be described below.

The die cutter 40B is disposed on the downstream side of the conveying unit 30. The die cutter 40B comprises a pair of a cutter roller 41 and an anvil roller 61, each roller being disposed horizontally so as to be freely rotatable around its axis of rotation. The rotational speeds of the cutter roller 41 and the anvil roller 61 are controlled so as to synchronize with the working of the adhesive applier 20. A label-material sheet 1S is fed into between the cutter roller 41 and the anvil roller 61.

A cutter blade 42 is formed on the periphery of the cutter roller 41. The cutter blade 42 may be in any shape so long as it is in the shape of labels 1 to be cut off the label-material sheet 1S. Labels 1 in the shape of the cutter blade 42 are cut off the label-material sheet 1S by the cutter blade 42.

Ventholes 43 are made in the periphery of the cutter roller 41. Air is blown out and sucked in through the ventholes 43 by means of a blower (not shown) and a vacuum pump (not shown). Air is sucked in through the ventholes 43 in the lower half of the periphery of the cutter roller 41 and blown out through the ventholes 43 in the upper half of the periphery. Thus the trim (not shown) of each label 1 is sucked onto the lower half of the periphery by the ventholes 43 and blown off the upper half of the periphery by the ventholes 43.

Every time the label-material sheet 1S is caught between the periphery of the anvil roller 61 and the cutter blade 42 of the cutter roller 41, a label 1 is cut off the sheet 1S.

Although not shown, the trims of cut-off labels 1 are collected and disposed of.

Now the label paster 60 will be described.

The anvil roller 61 is disposed horizontally, under the cutter roller 41, so as to be freely rotatable around its axis of rotation and in contact with the cutter blade 42 of the cutter roller 41.

Blowing holes 61*h* and sucking holes (hidden under labels 1) are made in the periphery of the anvil roller 61. Air is blown out of the blowing holes 61*h* by means of a blower (not shown) to remove the trim (not shown) immediately after each label 1 is cut off.

The sucking holes generate negative pressure by means of a blower or a vacuum pump and suck each cut-off label 1. Thus labels 1 are prevented from slipping on the periphery of the anvil roller 61 and, therefore, their positional slippage is prevented.

Every time the label-material sheet 1S is caught between the periphery of the anvil roller 61 and the cutter blade 42 of the cutter roller 41, a label 1 is cut off the sheet 1S.

Although not shown, the trims of cut-off labels 1 are collected and disposed of.

Paired driving roller 62 and roller 63 are disposed below the anvil roller 61, behind and in front of the anvil roller 61, respectively. The driving roller 62 is disposed horizontally so as to be freely rotatable. A conveying belt 64 is laid around the driving roller 62 and the roller 63. The conveying belt 64 is run by the rotation of the driving roller 62. The surface of the conveying belt 64 is coated with silicone so that labels 1 with pressure-sensitive adhesive 3 can come off the surface of the belt 64.

The conveying belt 64 is disposed between the anvil roller 61 and a packing sheet 2S and in contact with the periphery of the anvil roller 61. Accordingly the conveying belt 64 carries each label 1 received from the periphery of the anvil roller 61 in the running direction of the packing sheet 2S.

Reference number 69 is a guide plate.

Paired driving roller 65 and pressure roller 66 are disposed below, or downstream of, the guide plate 69. The driving roller 65, upstream of the pressure roller 66, is disposed horizontally so as to be freely rotatable around its axis of rotation. The pressure roller 66 is disposed horizontally so as to be freely rotatable around its axis of rotation and freely swingable up and down. A pressing vacuum belt 67 is laid around the driving roller 65 and the pressure roller 66. Many ventholes are made in the pressing vacuum belt 67. A vacuum box 68 is disposed between the driving roller 65 and the pressure roller 66, between the upper and lower sides of the pressing vacuum belt 67. The vacuum box 68 sucks in air through its bottom to generate negative pressure.

Accordingly while the driving roller 65 is rotating, the pressing vacuum belt 67 runs. When the pressure roller 66 is swung down, each label 1 is pressed onto and pasted on the packing sheet 2S firmly.

As in the case of the first embodiment, with the label-pasting device of this embodiment, the labels 1 cut off a label-material sheet 1S composed of only label-material are mechanically successively pasted onto certain positions on a packing sheet 2S without using peeling-off paper. Therefore the label-pasting cost is low.

Besides, as the label-pasting device of this embodiment is provided with the label paster 60, each label 1 is fed from the anvil roller 61 to the conveying belt 64, carried in the running direction of a packing sheet 2S by the conveying belt 64 , and pressed onto the surface of the packing sheet 2S by the pressing vacuum belt 67 with the vacuum box 68.

Accordingly, the labels 1 can be pasted on the packing sheet 2S firmly.

Now still another embodiment of label-pasting device will be described.

Figure 6:
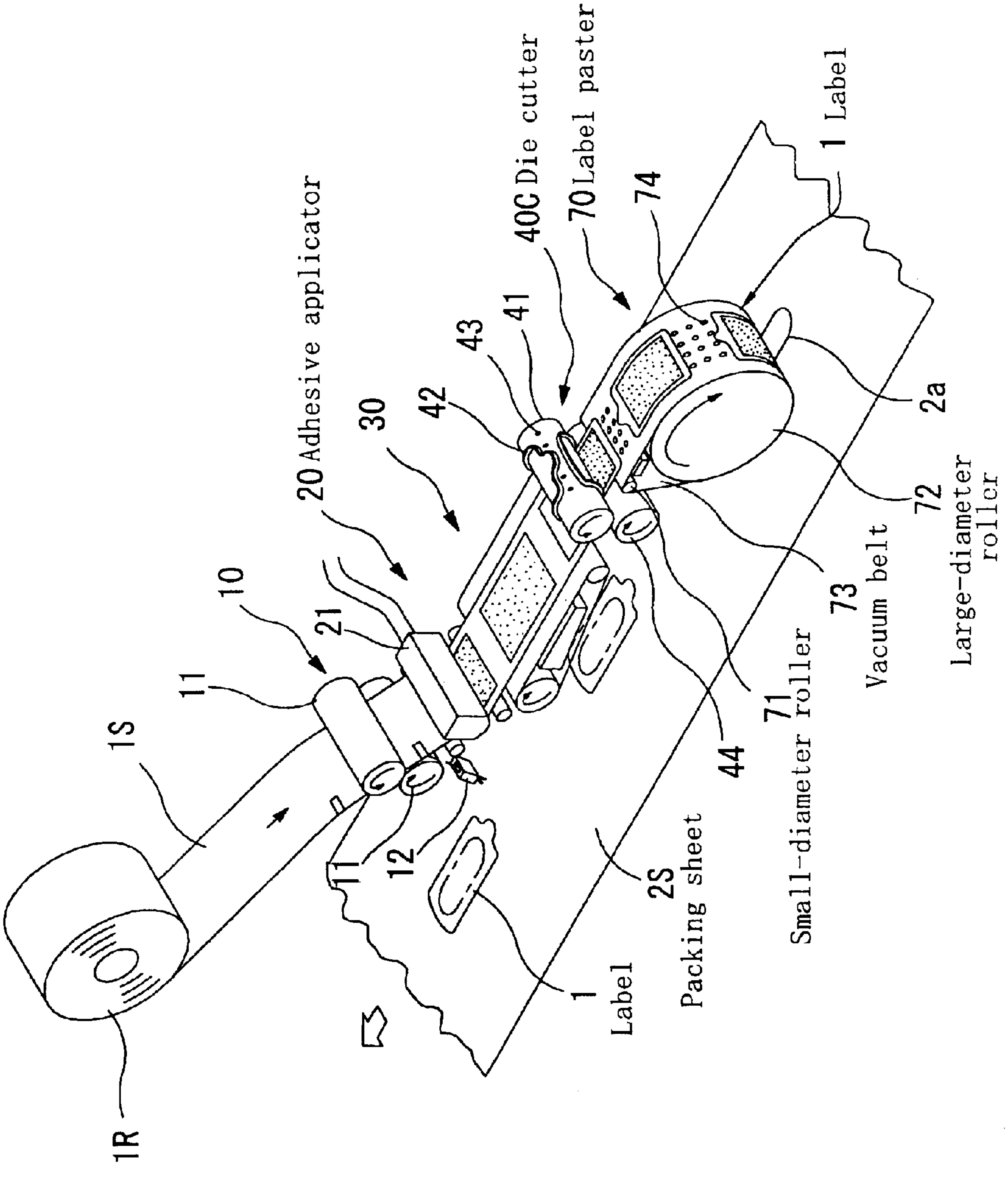
FIG. 6 is a perspective view of the main part of still another embodiment of label-pasting device of the present invention.

As shown in FIG. 6, the label-pasting device comprises a sheet-feeding unit 10, an adhesive applier 20, a conveying unit 30, a die cutter 40C, and a label paster 70. The sheet-feeding unit 10, the adhesive applier 20, and the conveying unit 30 are substantially the same as those of the label-pasting device of the first embodiment.

Accordingly the die cutter 40C and the label paster 70 will be described below.

The die cutter 40C is disposed on the downstream side of the conveying unit 30. The die cutter 40C comprises a pair of a cutter roller 41 and an anvil roller 44, each roller being disposed horizontally so as to be freely rotatable around its axis of rotation. The rotational speed of the cutter roller 41 and the anvil roller 44 is controlled so as to synchronize with the working of the adhesive applier 20. A label-material sheet 1S is fed into between the cutter roller 41 and the anvil roller 44.

A cutter blade 42 is formed on the periphery of the cutter roller 41. The cutter blade 42 may be in any shape so long as it is in the shape of labels 1 to be cut off the label-material sheet 1s. Labels 1 in the shape of the cutter blade 42 are cut off the label-material sheet 1S by the cutter blade 42.

Ventholes 43 are made in the periphery of the cutter roller 41. Air is blown out and sucked in through the ventholes 43 by means of a blower (not shown) and a vacuum pump (not shown). Air is sucked in through the ventholes 43 in the lower half of the periphery of the cutter roller 41 and blown out through the ventholes 43 in the upper half of the periphery. Thus the trim (not shown) of each label 1 is sucked onto the lower half of the periphery by the ventholes 43 and blown off the upper half of the periphery by the ventholes 43.

Every time the label-material sheet 1S is caught between the periphery of the anvil roller 44 and the cutter blade 42 of the cutter roller 41, a label 1 is cut off the sheet 1S.

Although not shown, the trims of cut-off labels 1 are collected and disposed of.

Now the label paster 70 will be described.

The label paster 70 is a vacuum belt unit comprising a small-diameter roller 71, a large-diameter roller 72, and a vacuum belt 73.

The small-diameter roller 71 is disposed horizontally, close to the exit of the die cutter 40C, so as to be freely rotatable around its axis of rotation.

The large-diameter roller 72 is disposed horizontally, below or downstream of the small-diameter roller 71, so as to be freely rotatable. The large-diameter roller 72 is so disposed that its periphery is in contact with a packing sheet 2S. Many sucking holes (not shown) are made in the periphery of the large-diameter roller 72 to generate negative pressure by means of a blower, constituting a vacuum mechanism.

The vacuum belt 73 is laid around the small-diameter roller 71 and the large-diameter roller 72. Many ventholes 74 are made in the vacuum belt 73. Accordingly each cut-off label 1 fed from the die cutter 40C is sucked onto the ventholes 74 of the vacuum belt 73 by means of the vacuum mechanism of the large-diameter roller 72.

As in the case of the first embodiment, with the label-pasting device of this embodiment, the labels 1 cut off a label-material sheet 1S composed of only label-material are mechanically successively pasted onto certain positions on a packing sheet 2S without using peeling-off paper. Therefore the label-pasting cost is low.

Besides, as the label-pasting device of this embodiment is provided with the label paster 70, while each label 1 is sucked onto the ventholes 74 of the vacuum belt 73, it is pasted on a packing sheet 2S. Accordingly positional slippage of labels 1 is prevented and they are pasted accurately on the packing sheet 2S.

Figure 7:
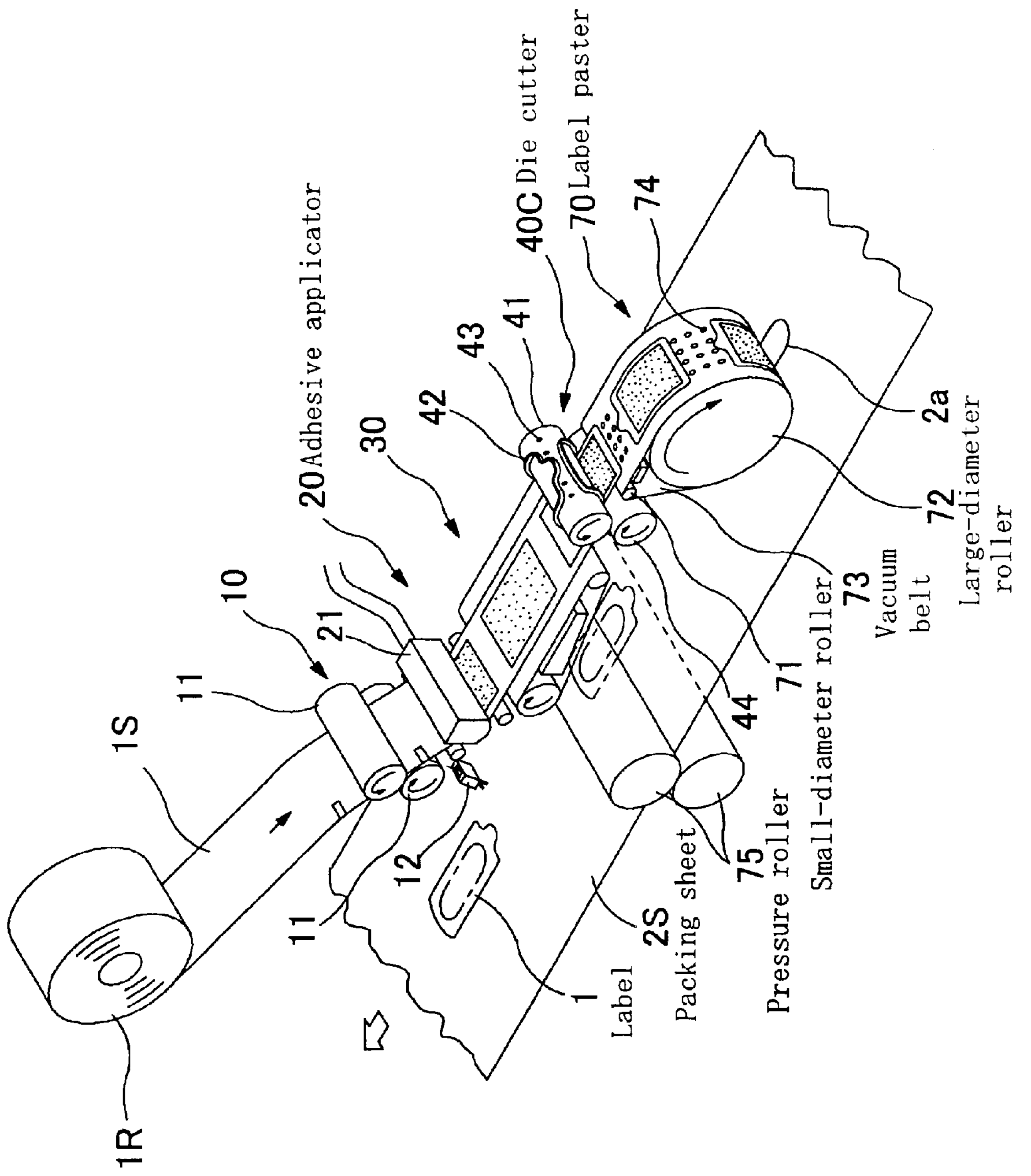
FIG. 7 is a perspective view of the main part of the label-pasting device of FIG. 6, to which a pair of pressure rollers is added.
Figure 8:
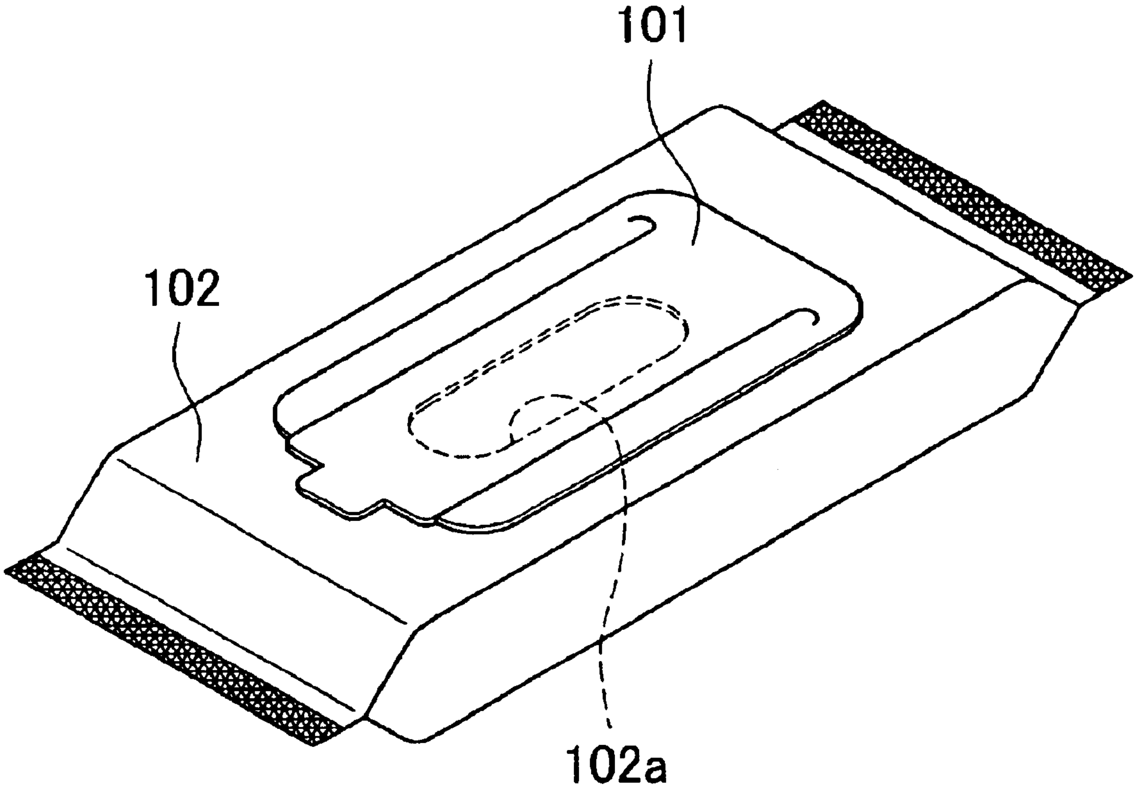
FIG. 8 shows an example of lid labels.
Figure 9:
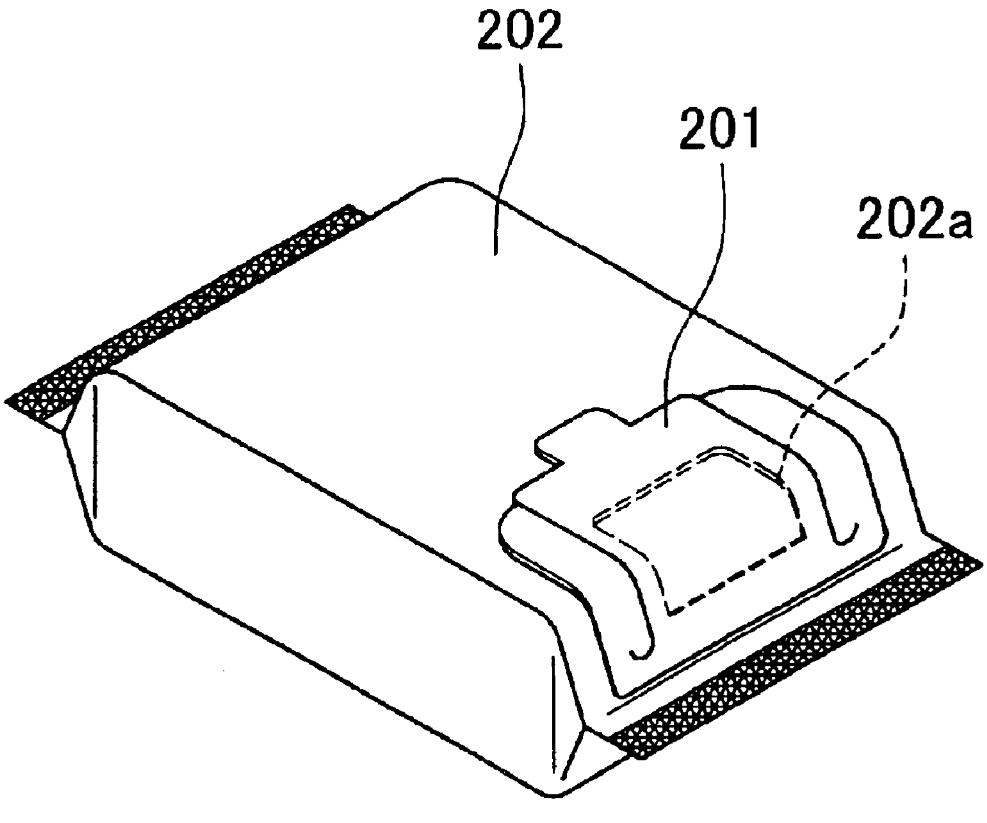
FIG. 9 shows another example of lid labels.
Figure 10:
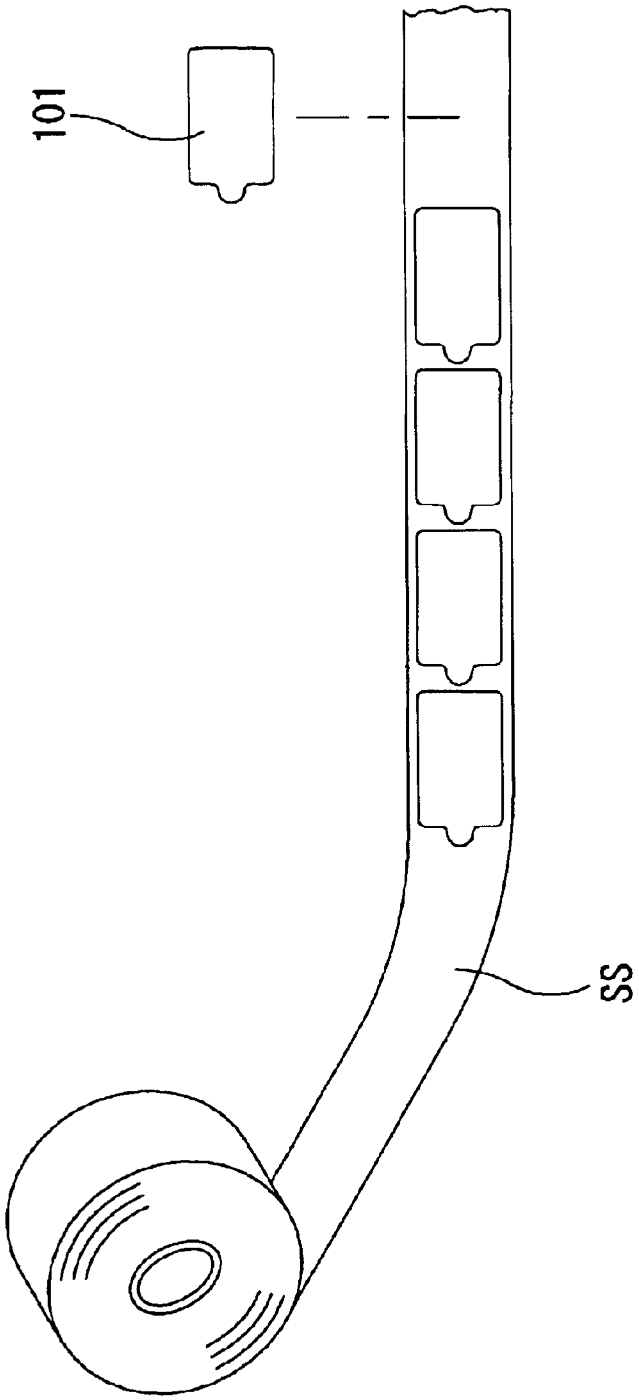
FIG. 10 is an illustration of the label-pasting method in accordance with the prior art.

It is preferable to add a pair of pressure rollers 75 and 75 to the label-pasting device of this embodiment as shown in FIG. 7. Namely the pair of pressure rollers 75 and 75 is disposed below, or downstream of, the large-diameter roller 72. A packing sheet 2S with labels 1 are fed into between the pressure rollers 75 and 75.

The paired pressure rollers 75 and 75 press the labels 1 onto the packing sheet 2S; accordingly the labels 1 are pasted firmly on the packing sheet 2S.

As described above, with the above embodiments of label-pasting device of the invention, the label-pasting cost is low.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A label-pasting device comprising:

an adhesive applier for applying hot-melt adhesive to a label-material sheet composed of only label material;

a die cutter for cutting out labels from the label-material sheet with hot-melt adhesive; and a label paster for pasting the cut-out labels on a packing sheet;

wherein the adhesive applier applies hot-melt adhesive to an area within the outline of, and smaller than, each label portion of the label material sheet to be cut out by the die cutter and wherein the label paster is a vacuum-belt unit disposed on the exit side of the die cutter, the vacuum-belt unit comprising:

a small-diameter roller disposed close to the exit of the die cutter;

a large-diameter roller which is disposed so as to be in contact with the packing sheet and provided with a vacuum mechanism; and a vacuum belt which is laid around the small-diameter roller and the large-diameter roller and has many vent-holes.

2. A label-pasting device as claimed in claim 1 wherein a pair of pressure rollers is disposed on the downstream side of the large-diameter roller to press each label onto the packing sheet.

* * * * *